United States Patent
Taylor et al.

[11] Patent Number: 5,961,002
[45] Date of Patent: Oct. 5, 1999

[54] RECEIVAL HOPPER

[75] Inventors: Geoffrey James Wolfe Taylor; Wayne Matthew Taylor, both of Blenheim, New Zealand

[73] Assignee: Taylors Engineering (Blenheim) Limited, Blenheim, New Zealand

[21] Appl. No.: 08/915,905

[22] Filed: Aug. 21, 1997

[30] Foreign Application Priority Data

Aug. 29, 1996 [AU] Australia .................................. PO2027

[51] Int. Cl.⁶ .................................................. B65G 65/30
[52] U.S. Cl. ......................... 222/164; 222/412; 414/421; 414/787
[58] Field of Search ..................................... 414/419, 421, 414/425, 326, 526, 787; 198/550.2; 222/164, 166, 160, 162, 412, 413

[56] References Cited

U.S. PATENT DOCUMENTS

| | | | |
|---|---|---|---|
| 2,834,493 | 5/1958 | Romberg | 414/526 X |
| 3,056,521 | 10/1962 | Marr | 414/526 X |
| 3,280,996 | 10/1966 | McKinney | 414/421 X |
| 4,157,150 | 6/1979 | Hetrick | 414/526 X |
| 4,293,264 | 10/1981 | Gilts et al. | 414/421 X |
| 4,348,148 | 9/1982 | Wilding et al. | 414/421 |
| 4,798,510 | 1/1989 | Lazenby | 414/526 X |
| 4,802,810 | 2/1989 | Gunn | 414/421 |
| 4,864,748 | 9/1989 | Boyer | 414/526 X |
| 5,006,039 | 4/1991 | Niederer | 414/421 X |

FOREIGN PATENT DOCUMENTS 1-122832  5/1989  Japan ..................................... 414/526

*Primary Examiner*—David A. Bucci
*Attorney, Agent, or Firm*—Ross, Ross & Flavin

[57] ABSTRACT

A receival hopper for delicate and fragmentary particulate material such as fruit berries or bark pieces, in which the hopper (2) includes a support frame (5) with a receiving bin (3) pivotally secured to the frame (5) and an auger (4) which includes an auger screw (8), extending along a peripheral lip of the receiving bin at or adjacent the pivot, with a pair of adjacent but spaced hydraulic rams (6) secured between the bin and the support frame for moving the bin between lowered and raised positions relative to the support frame.

6 Claims, 4 Drawing Sheets

RECEIVAL HOPPER

TECHNICAL FIELD

The present invention relates to an improved receival hopper and in particular, to a hopper associated with an auger for the conveyance of delicate and fragmentary material such as fruit, berries, bark pieces or metamorphic rock.

BACKGROUND

Static receival hoppers are known and essentially consist of a funnel shaped hopper having an open top for the receipt of material and a basal channel connected to an auger. The construction and arrangement is such that the material is gravity fed from the internal cavity of the hopper onto the auger.

The filling procedure of the static receival hopper machines requires specialised loading equipment or the construction of an access ramp in view of the height at which the hopper must be secured to effect gravity feeding. Similarly, it is difficult to monitor the level of material within the internal cavity of the hopper from ground level.

Another disadvantage of static receival hopper designs is that the basal channel frequently can become obstructed with large debris or by the agglutination of proteinaceous material (e.g. macerated grapes). Further, the contents within the internal cavity of the hopper may bridge adjacent the obstruction effecting a blockage. In order to clear the blockage, the operator is required to work in the vicinity of the auger screw which poses a serious safety hazard.

It is the object of the present invention to provide an improved receival hopper of simple construction which will go at least some way towards overcoming the aforementioned difficulties.

DISCLOSURE OF INVENTION

The present invention provides a receival hopper comprising a support frame; a receiving bin pivotally secured to said support frame, said receiving bin comprising a receptacle having a closed base, and an open top defined by a peripheral lip, moving means secured between said bin and said support frame, for moving said bin between lowered and raised positions relative to said support frame, and an auger including an auger screw extending along a lip of the bin at or adjacent said pivot, said auger being secured to said bin for movement therewith, said auger being secured along or adjacent that portion of the peripheral lip of the bin which is uppermost when the bin is in the lowered position and lowermost when the bin is in the raised position.

Preferably, said auger moves in unison with said receiving bin.

Preferably the means to move said bin between the lowered position and the raised position is a pair of adjacent but spaced hydraulic rams. Alternatively, the means to move said bin is a shaft driven by a stepping motor.

Preferably, said auger comprises a rotatable screw shaft, mounted in bearings and partly protected by a shroud.

Optionally, said hopper further includes a removable lid dimensioned to cover the open top of said bin.

Preferably, the base of the support frame is secured to a platform incorporating an access ramp whereby a carrier or loading means can be orientated adjacent the top of said bin. Optionally, the platform further includes a zero balanced weighing device to determine the volume of material in the bin of said hopper.

BRIEF DESCRIPTION OF THE DRAWINGS

By way of example only, preferred embodiments of the present invention are described in detail with reference to the accompanying drawings in which.

MODE FOR CARRYING OUT THE INVENTION

Figure 1:
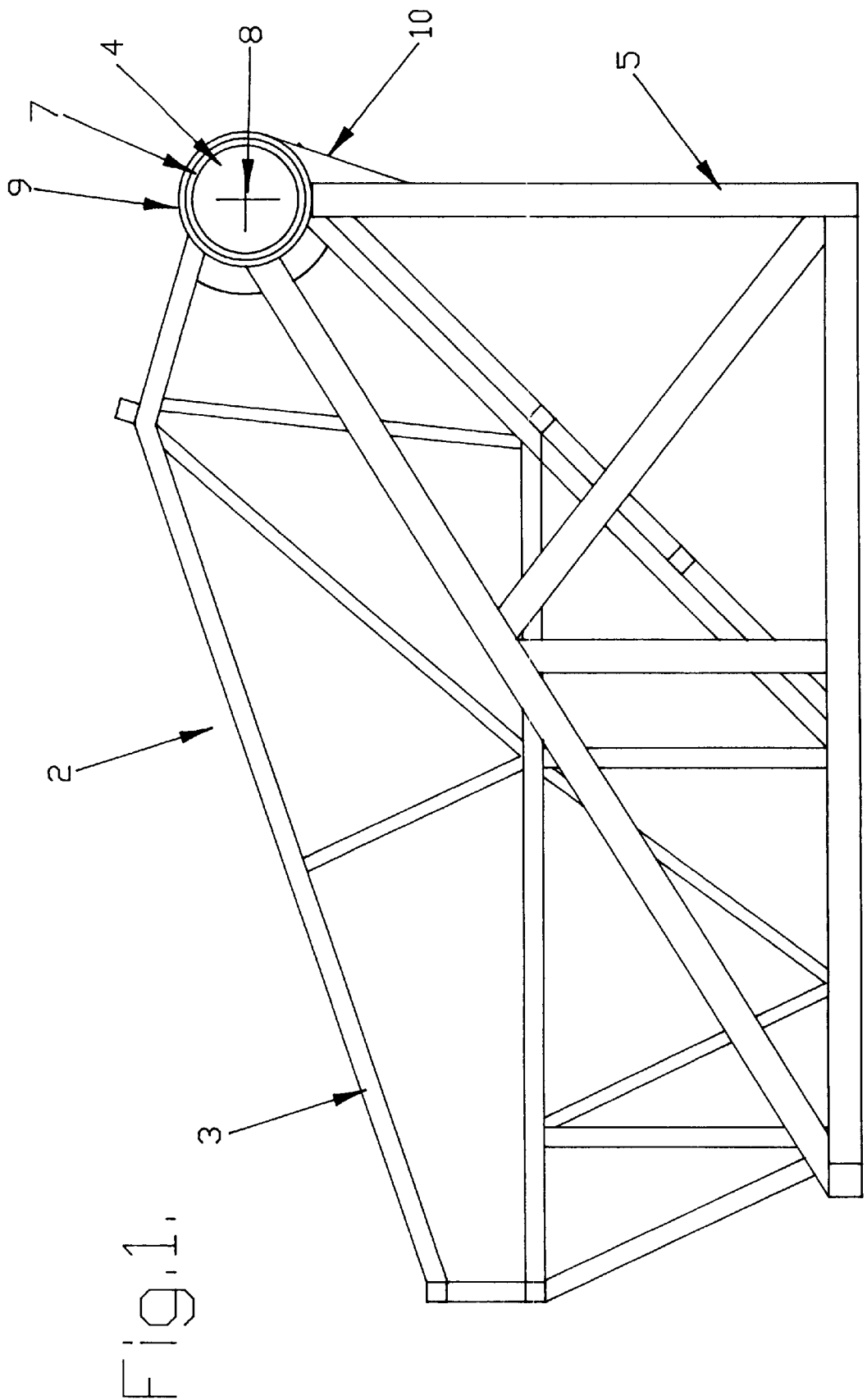
FIG. 1 is a side view of a first embodiment of the invention depicting the bin in the lowered position.

Referring to the drawings, a receival hopper 2, 12 is thereshown. The hopper 2, 12 comprises a support frame 5, 15 a tilting bin 3, 13 incorporating a horizontal auger 4, 14 and a pair of adjacent but spaced hydraulic rams 6, 16.

The bin 3, 13 with auger 4, 14 moves between an initial lowered position (shown for the first embodiment only, in FIG. 1) and a raised position (FIG. 3, FIG. 4) by the extension of the hydraulic rams 6, 16.

It will be appreciated that the bin 3, 13 may be any desired polygonal shape and capacity, having an open top for the receipt of material and inwardly inclined side walls adjacent auger 4, 14. Preferably, the angle of incline of the side walls adjacent the auger is at least 130°.

Preferably, the bin 3, 13 and auger 4, 14 are made of stainless steel for ease of cleaning. Alternatively, the internal cavity of the bin 3, 13 may be lined with a durable hydrophobic material. The bin 3, 13 may be provided with a removable lid 3b (FIG. 2 only).

Optionally, the bin 3, 13 further includes a means of refrigeration for the long term storage of material when the bin 3, 13 is in the lowered position. Optionally, the auger 4, 14 includes a drainage means (not shown) adjacent but spaced from the screw 8, 18 whereby any liquid filters through a screen to a resealable collection unit in the base of the auger housing. A further drainage means (not shown) may be located along the base of the bin 3, 13.

Figure 2:
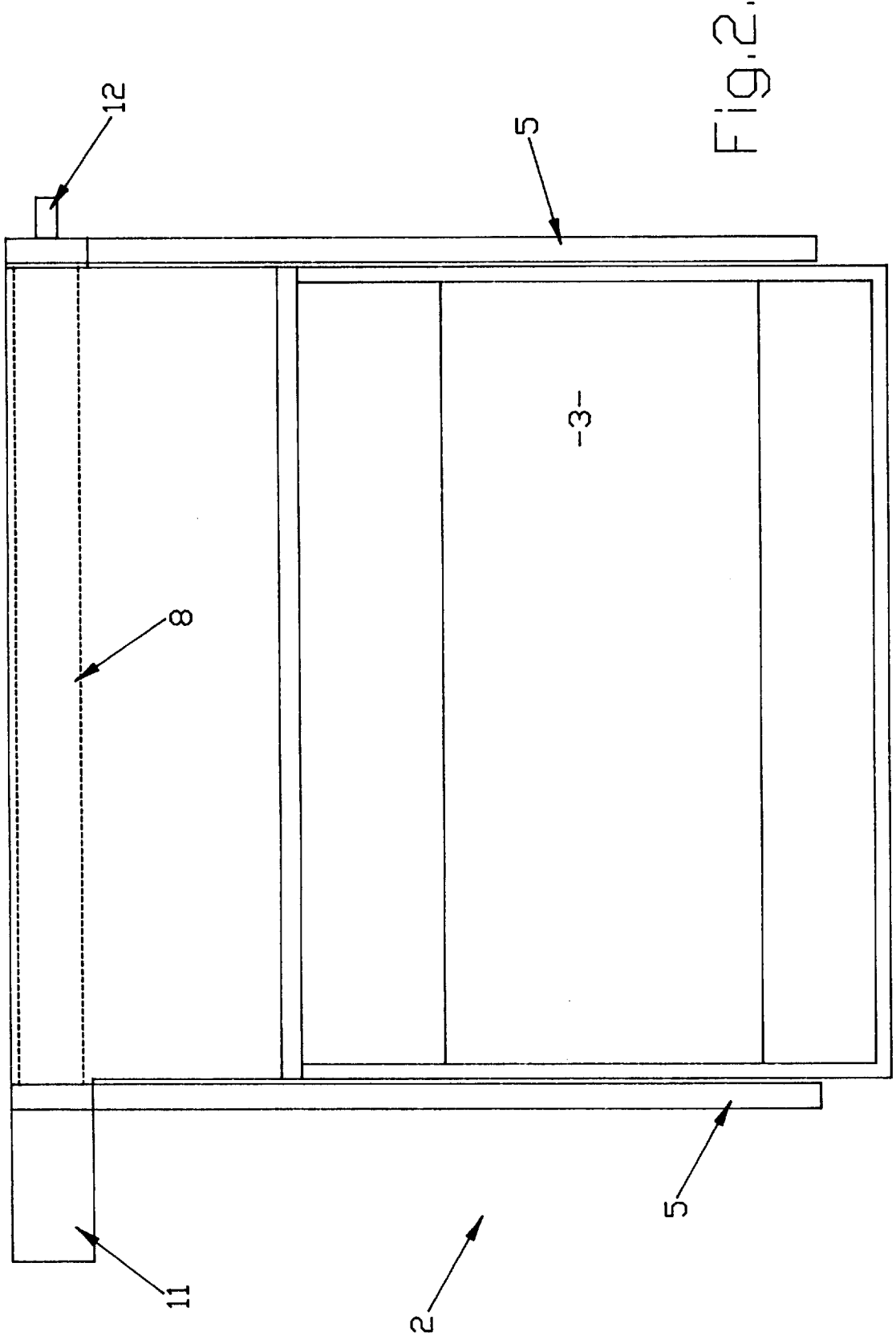
FIG. 2 is a plan view from above of the hopper of FIG. 1, the dotted line indicating the position of the auger.
Figure 3:
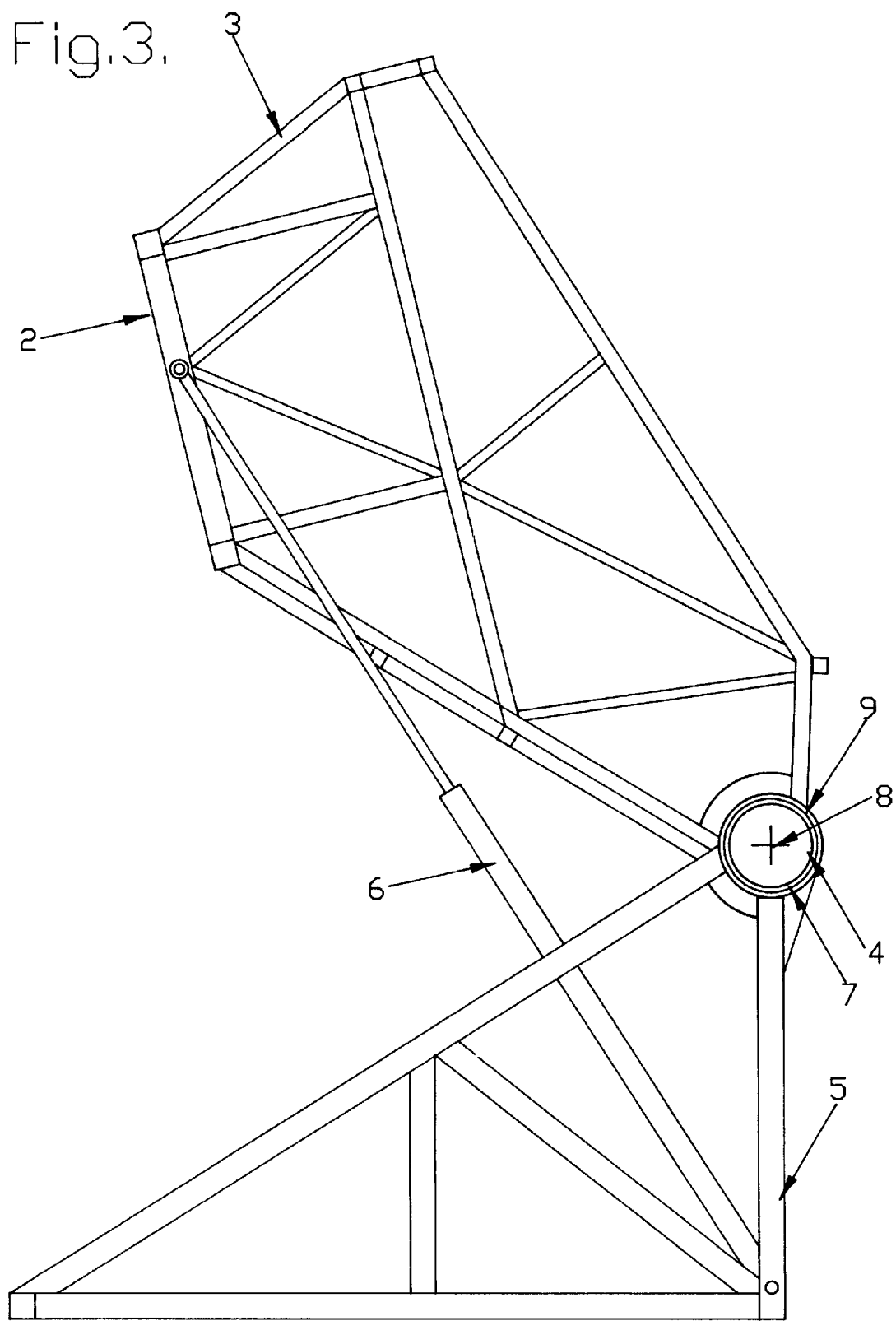
FIG. 3 is a side view of the hopper of the FIG. 1 depicting the bin in a raised position.

Referring to FIGS. 1–3, a first preferred embodiment of the invention is thereshown. One peripheral lip of the bin 3 is formed as a part circular shroud 7 in which the auger 4 is concentrically mounted horizontally along the lip of the bin. The shroud 7 surrounds and shields the upper and outer parts of the auger, so that the only portion of the auger exposed is that adjacent the interior of the bin. This decreases the risk of an operator accidentally contacting the auger in use. The part circular shroud 7 extends out at one side of the bin 3 to form a discharge chute 11 and at the opposite end of the auger is mounted a motor (12, FIG. 2) for powering an auger screw 8. The bin 3 and auger 4 combined are pivotally secured to the support frame 5 by two ring bearings 9, which are concentric with the auger and the shroud.

Figure 4:
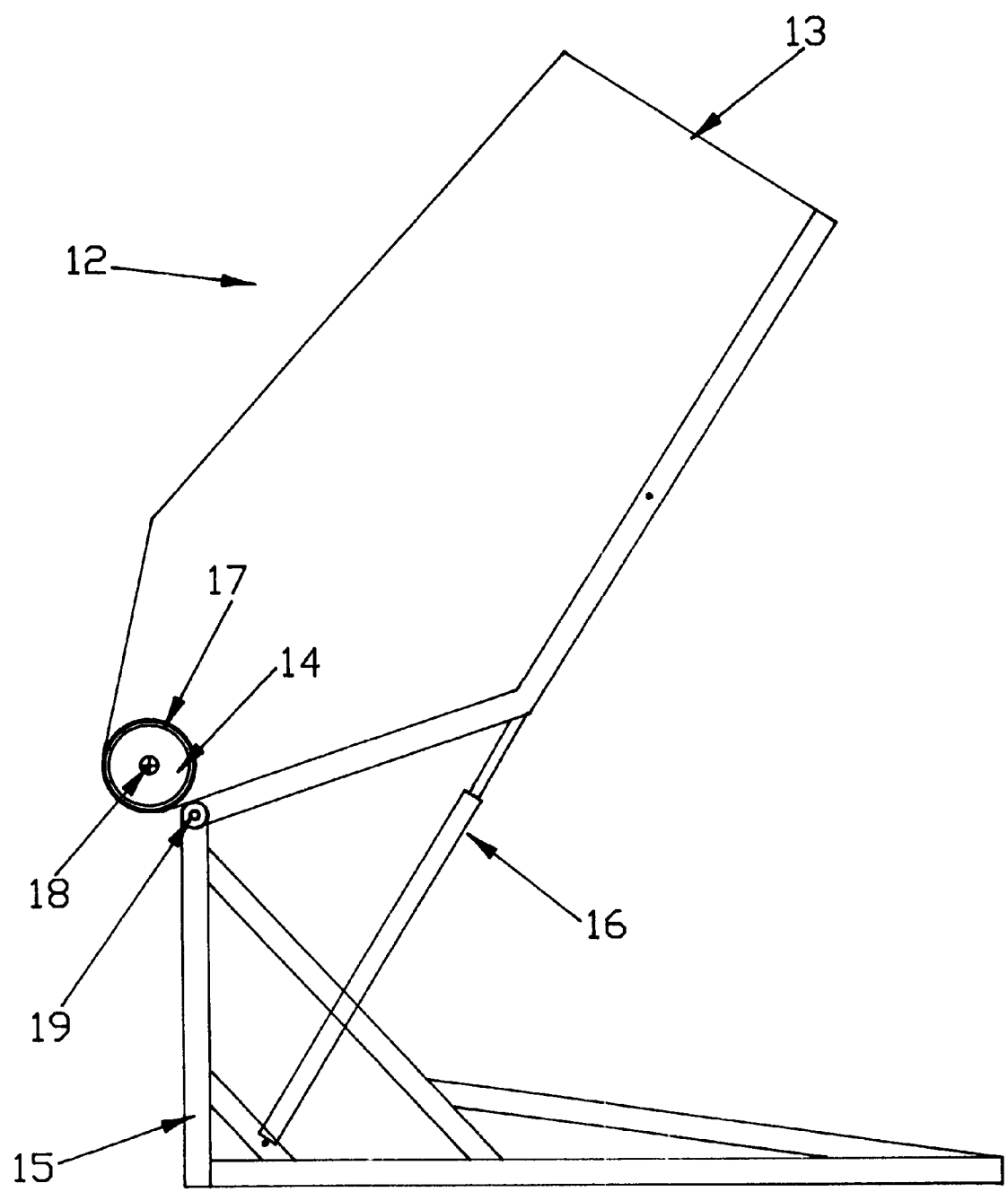
FIG. 4 is a diagrammatic side view of a second embodiment of the invention depicting the bin in the raised position.

Referring to FIG. 4, a second preferred embodiment of the present invention is thereshown. One peripheral lip of the bin 3 is formed as or provided with a part-circular shroud 17 in which an auger screw 14 is concentrically mounted horizontally along the lip of the bin. The circular shroud 17 extends out at one side of the bin 13 to form a discharge chute (not visible) and at the opposite end of the auger is mounted a motor (not shown) for powering an auger screw 18. The bin 13 and auger 14 combined are pivotally secured to the support frame 15 by a pivot 19 adjacent each end of the lip of the bin, but spaced a short distance below said lip.

Referring to the drawings, in use the bin 3, 13 is oriented in the initial position (FIG. 1, for the first embodiment) and material (for example, grapes), is loaded into the internal cavity of the bin 3, 13. When material is to be loaded out from the bin, the bin is gradually raised by extending the rams 6, 16; at the same time, but under independent control, the auger 4, 14 is activated and the grapes fall into the auger under gravity feeding and due to the incline of the side walls of the bin 3, 13. The grapes are conveyed by the screw 8, 18 to the discharge chute 11. The output from the discharge chute 11 is then transferred to other equipment for further processing, for example—a grape press or a tubing chute connected to a heat exchanger. Maximum output of grapes through the hopper 2, 12 is achieved by adjusting the orientation of the bin 3, 13 between the raised and lowered positions as necessary. For example, when the level of grapes within the internal cavity of the bin 3, 13 is low, the bin 3, 13 can be moved to a raised position (FIGS. 3, 4) to promote gravity feeding. Advantageously, the graduated adjustment of the incline of bin 3, 13 minimises the occurrence of maceration or fragmentation of the material. In contrast to static hopper units, the weight of the material within the bin 3, 13 can be evenly distributed by adjusting the orientation of the bin 3, 13.

We claim:

1. A receival hopper comprising a support frame, a receiving bin pivotally secured to said support frame, said receiving bin comprising a receptacle having a closed base and an open top defined by a peripheral lip, moving means secured between said bin and said support frame, for moving said bin between lowered and raised positions relative to said support frame, and an auger including an auger screw extending along a lip of the bin at or adjacent said pivot, said auger being secured to said bin for movement therewith, said auger being secured along or adjacent that portion of the peripheral lip of the bin which is uppermost when the bin is in the lowered position and lowermost when the bin is in the raised position.

2. A receival hopper as claimed in claim 1 further comprising a shroud arranged to partially surround said auger such that only the portion of the auger screw adjacent said bin is exposed.

3. A receival hopper as claimed in claim 2 wherein said shroud is formed integrally with said bin.

4. A receival hopper as claimed in claim 2 wherein said shroud is extended at one end of the auger to form a discharge chute.

5. A receival hopper as claimed in claim 1 wherein said moving means comprises a pair of spaced hydraulic rams.

6. A receival hopper as claimed in claim 1 wherein said hopper further includes a removable lid dimensioned to cover the open top of said bin.

* * * * *